US008773502B2

(12) United States Patent
Rapoport et al.

(10) Patent No.: US 8,773,502 B2
(45) Date of Patent: Jul. 8, 2014

(54) SMART TARGETS FACILITATING THE CAPTURE OF CONTIGUOUS IMAGES

(71) Applicant: Google Inc., Mountain View, CA (US)

(72) Inventors: Evan Rapoport, Los Altos, CA (US); Christian Robertson, Pleasanton, CA (US); Nirav Bipinchandra Mehta, Sunnyvale, CA (US); Scott Ettinger, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/914,375

(22) Filed: Jun. 10, 2013

(65) Prior Publication Data

US 2014/0118483 A1    May 1, 2014

Related U.S. Application Data

(60) Provisional application No. 61/792,571, filed on Mar. 15, 2013, provisional application No. 61/719,952, filed on Oct. 29, 2012.

(51) Int. Cl.
*H04N 7/18* (2006.01)
*H04N 5/232* (2006.01)
*H04N 5/262* (2006.01)
*H04N 5/225* (2006.01)

(52) U.S. Cl.
CPC ......... *H04N 5/23258* (2013.01); *H04N 5/2628* (2013.01); *H04N 5/2259* (2013.01)
USPC ................................. 348/36; 348/39; 348/158

(58) Field of Classification Search
CPC   H04N 5/23258; H04N 5/2628; H04N 5/2259
USPC ...................... 348/36–60, 142–161
See application file for complete search history.

(56) References Cited

U.S. PATENT DOCUMENTS

| 2007/0025723 A1 | 2/2007 | Baudisch et al. |
| 2011/0228044 A1 | 9/2011 | Miyamoto et al. |
| 2011/0234750 A1 | 9/2011 | Lai et al. |
| 2012/0307000 A1* | 12/2012 | Doepke et al. .................. 348/36 |

FOREIGN PATENT DOCUMENTS

| JP | 2000101895 A | 4/2000 |
| JP | 2009060278 A | 3/2009 |

OTHER PUBLICATIONS

PCT/US2013/067279 International Search Report and Written Opinion, Mailed Apr. 3, 2014.

* cited by examiner

*Primary Examiner* — Andy Rao
(74) *Attorney, Agent, or Firm* — Troutman Sanders LLP; James E. Schutz; Jay R. Anderson

(57) ABSTRACT

Systems and methods facilitating the capture of contiguous images suitable for composition into a wide-angle or panoramic image. The method may include displaying smart graphical targets on an image capture graphical user interface representing target focal points to direct a camera to in order capture images with sufficient continuity or overlap for panorama creation. In one implementation, the method may include automatically capturing an image when the center of the current field of view is aligned with or within a threshold distance of a target focal point. In another implementation, the method may provide graphical targets along multiple axes. In another implementation the method may provide graphical targets for creating a panoramic image adhering to a certain aspect ratio. In another implementation, the method may suggest graphical targets on the motion of a camera after capturing a first image.

20 Claims, 10 Drawing Sheets

SMART TARGETS FACILITATING THE CAPTURE OF CONTIGUOUS IMAGES

CROSS-REFERENCE TO RELATED APPLICATIONS

This application claims priority and the benefit under 35 U.S.C. §119(e) of U.S. Provisional Patent Application No. 61/719,952, filed 29 Oct. 2012, and of U.S. Provisional Patent Application No. 61/792,571, filed 15 Mar. 2013, all of which the entire contents and substance are hereby incorporated by reference as if fully set forth below.

BACKGROUND

Panoramic images, or panoramas, can provide a more immersive viewing experience by providing a wider field of view, or aspect ratio, than standard images. Conventional panoramic images can be captured with special wide-angle or panoramic lenses. However, panoramic images may also be created by assembling or "stitching" together contiguous images taken from standard lenses. The proliferation of consumer image capture devices (e.g., digital cameras) and recent developments in image processing software have placed the ability to create high-quality panoramic images in the hands of casual photographers. Moreover, image capture devices and software suitable for creating panoramas are becoming common on mobile computing devices (e.g., smartphones and tablets).

Although improvements in image processing technology and processor power have simplified, and in some cases, automated, the assembly of source images into panoramas, the efficient capture of images that are suitable for "stitching" is still an area of development. Source images must meet certain criteria for successful assembly into a panorama. For example, the source images must have sufficient continuity or overlap for stitching. Photographers unaccustomed to creating panoramas may lack the experience or skill necessary for selecting and taking shots resulting in suitable images. Without direction, the casual or amateur photographer may take too many pictures, resulting in wasted time, battery power, and memory space; or worse, too few pictures, resulting in distorted or disjoint panoramic images. Even a skilled photographer attempting to shoot a large panoramic scene may not be able to capture suitable images in time to create the desired panorama before the scene to be captured changes or is lost completely.

SUMMARY

Some or all of the above needs may be addressed by certain implementations of the disclosed technology. Certain implementations may include systems and methods for facilitating the capture of contiguous images. According to an example implementation, a method is provided. The method may include receiving, at a computing device and from an image capture device, a first image captured by the image capture device. The method may also include outputting, for display at display device, a representation of the first image, and a graphical target that corresponds to a center of a region representing a potential second image to be captured, the region partially overlapping the representation of the first image, and outputting, for display at the display device, a representation of a center of a current field of view of the image capture device. The method may further include receiving, at the computing device, a second image captured by the image capture device, the second image captured responsive to determining that the representation of the center of the current field of view of the image capture device is within a threshold distance, on the display device, of the graphical target. The method may yet further include outputting, for display at the display device, in response to receiving the second image and for display, a representation of the first image and the second image.

According to another example implementation, a system is provided. The system may include a display device, at least one processor operatively coupled to the display device, an image capture device coupled to the at least one processor, and at least one memory operatively coupled to the at least one processor. The memory may be configured for storing data and instructions. When executed by the at least one processor, the data and instructions may cause the processor to: receive, at a computing device and from an image capture device, a first image captured by the image capture device. The system may be further caused to output, for display at the display device, a representation of the first image, and a graphical target that corresponds to a center of a region representing a potential second image to be captured, the region partially overlapping the representation of the first image, and output, for display at the display device, a representation of a center of a current field of view of the image capture device. The system may yet be further caused to receive, at the computing device, a second image captured by the image capture device, the second image captured responsive to determining that the representation of the center of the current field of view of the image capture device is within a threshold distance, on the display device, of the graphical target, and output, for display at the display device, in response to receiving the second image and for display, a representation of the first image and the second image.

According to another example implementation, a computer-readable medium is provided. The computer-readable medium may store instructions that, when executed by at least one processor in a system, cause the system to perform a method. The method may comprise: receiving, at a computing device and from an image capture device, a first image captured by the image capture device. The method may further comprise outputting, for display at a display device, a representation of the first image, and a graphical target that corresponds to a center of a region representing a potential second image to be captured, the region partially overlapping the representation of the first image, and outputting, for display at the display device, a representation of a center of a current field of view of the image capture device. The method may yet further comprise receiving, at the computing device, a second image captured by the image capture device, the second image captured responsive to determining that the image capture device is within a threshold distance, on the display device, of the graphical target, and outputting, for display at the display device, in response to receiving the second image and for display, a representation of the first image and the second image.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
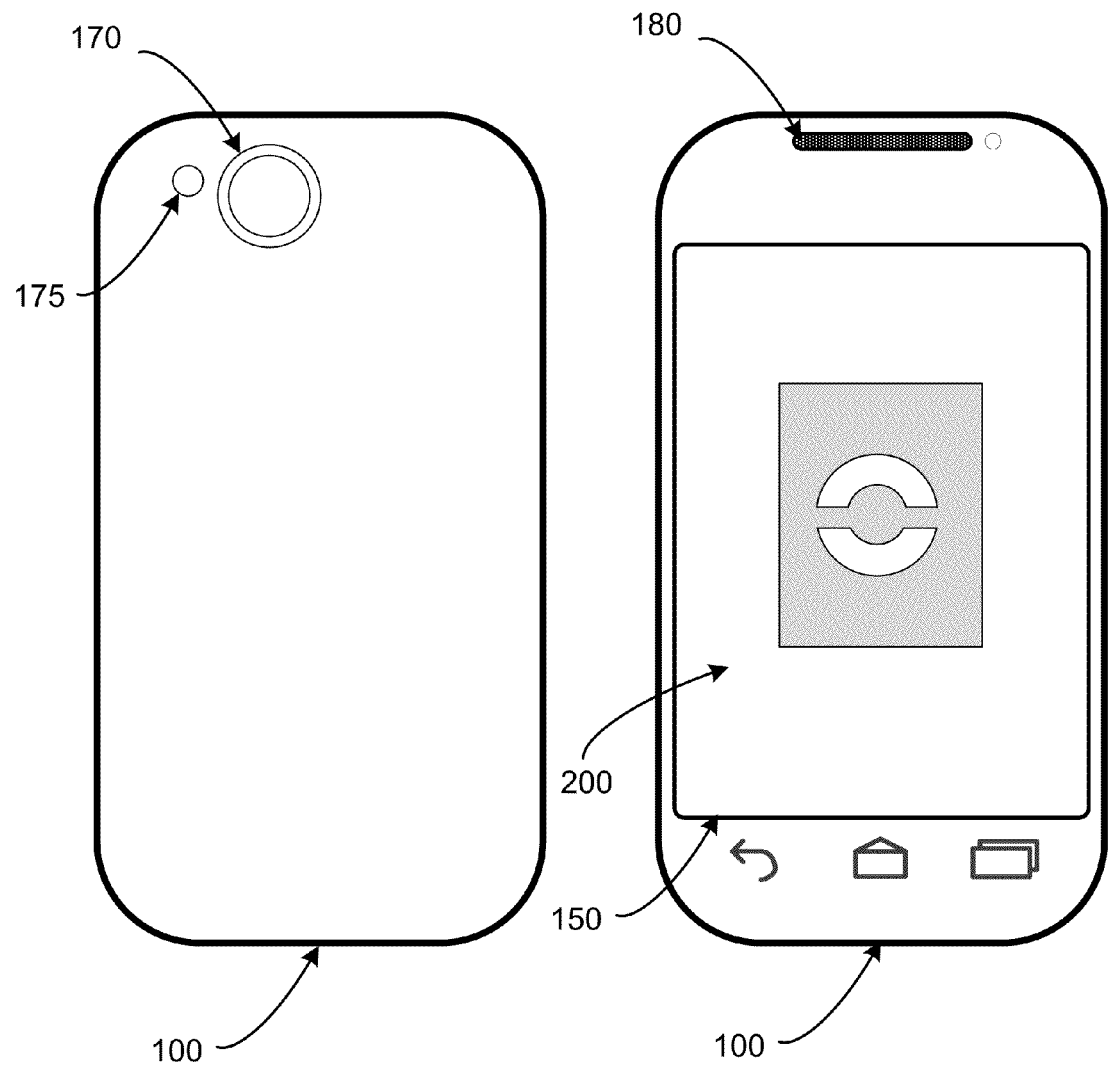
FIG. 1 depicts an illustration of a computing device, according to an example implementation.

To facilitate an understanding of the principles and features of implementations of the disclosed technology, various example implementations are explained below. Although some example implementations of the disclosed technology are explained in detail, other implementations are contemplated. Further, in describing the example implementations, specific terminology will be resorted to for the sake of clarity. It is not intended that the disclosed technology be limited in scope to the details of construction and arrangement of components set forth in the following description or illustrated in the drawings. Rather, the disclosed technology is capable of other implementations and of being practiced or carried out in various ways.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Various implementations of the disclosed technology relate to facilitating the capture of contiguous images for assembly into a wide-angle or panoramic image. An example implementation may provide one or more target focal points to direct a current field of view of a camera, thereby facilitating capture of a suitable next image for composing a panorama. In a further implementation, the next image may be automatically captured responsive to determining the current field of view of the camera to be directed at or near a target focal point, to ensure the capture of a suitable image. In some implementations, the target focal points may be represented on a display device by graphical targets. Accordingly, the determining may include determining that a representation of the center of the current field of view of the image capture device is within a threshold distance, on the display device, of a graphical target.

Referring now to the figures, in which like reference numerals represent like parts throughout the views, various implementations of the disclosed technology will be described in detail.

FIG. 1 depicts an illustration of a computing device 100, according to an example implementation. As shown in FIG. 1, the computing device 100 may be a mobile computing device, for example, a smartphone or a tablet. The computing device may have a built-in or integrated display 150 for displaying an image-capture graphical user interface 200. The display 150 may be combined with a presence sensitive input device to form a touch-sensitive or presence-sensitive display for receiving user input from a stylus, finger, or other means of gesture input. In some implementations of the disclosed technology, the computing device may be a non-mobile computing device, for example, a personal computer in communication with an internal or external first display. In some implementations, the computing device may also include a sound producing device 180, such as a speaker, piezoelectric buzzer, or the like.

The computing device 100 may be in communication with an image capture device 170. For example, as shown in FIG. 1, the computing device may include a built-in or internal image capture device, for example, a camera or CCD. In some implementations, the computing device may have two or more cameras. In another example implementation, the image capture device may be external to the computing device and in communication with the computing device, for example, through a direct connection, or wireless coupling.

In some implementations, the image capture device 170 may be associated with one or more lighting implements or other devices for aiding in the capture of images. These devices may be operatively coupled with the computing device 100, for example, using a camera interface 614. For example, as shown in FIG. 1, the computing device includes a flash unit 170 for producing a flash of artificial light. In some implementations, the computing device may have one or more sensors for sensing the position, orientation, and other information about the computing device, and/or image capture device.

Figure 2:
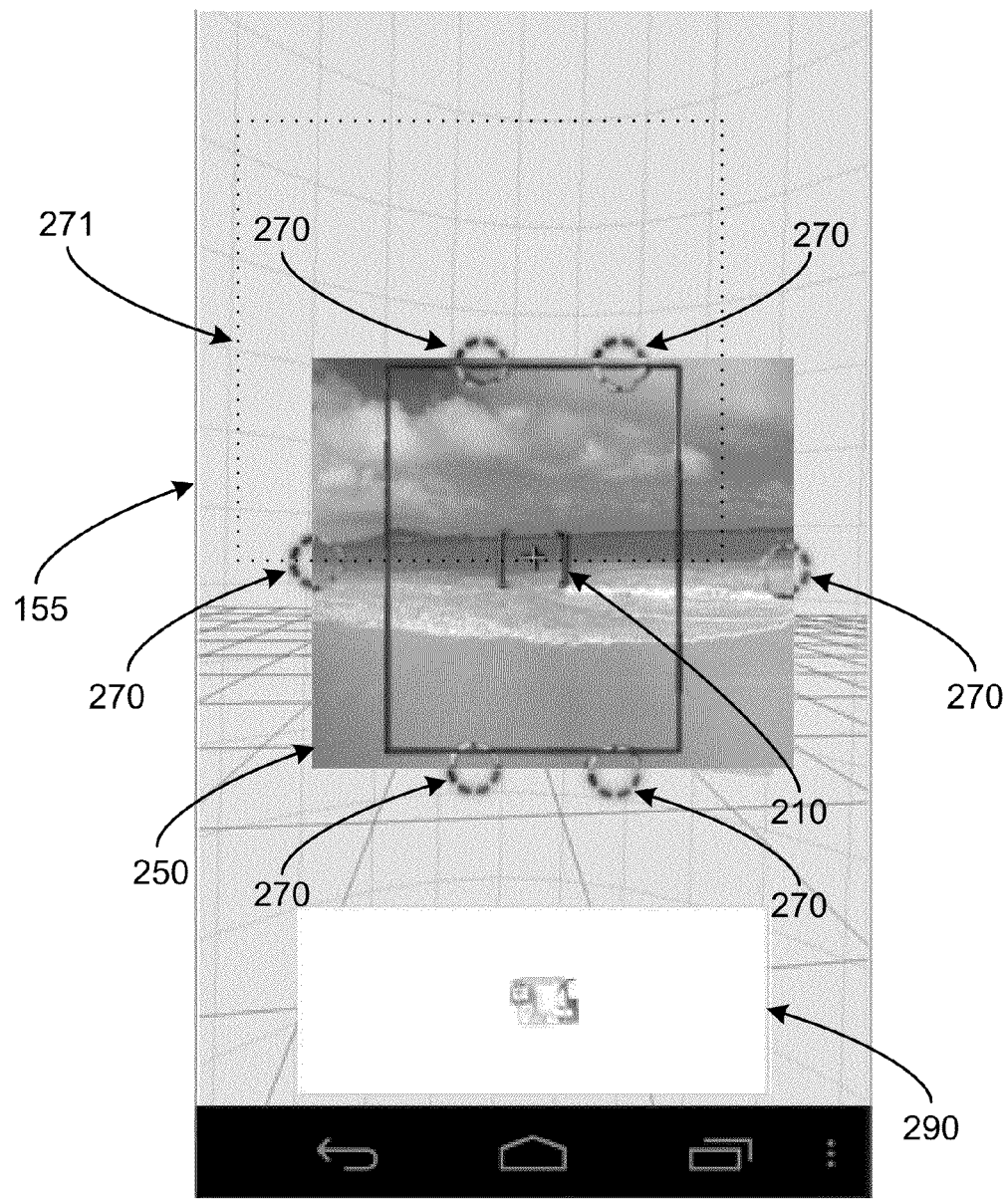
FIG. 2 depicts an illustration of an example image capture interface with smart targets, according to an example implementation.
Figure 3:
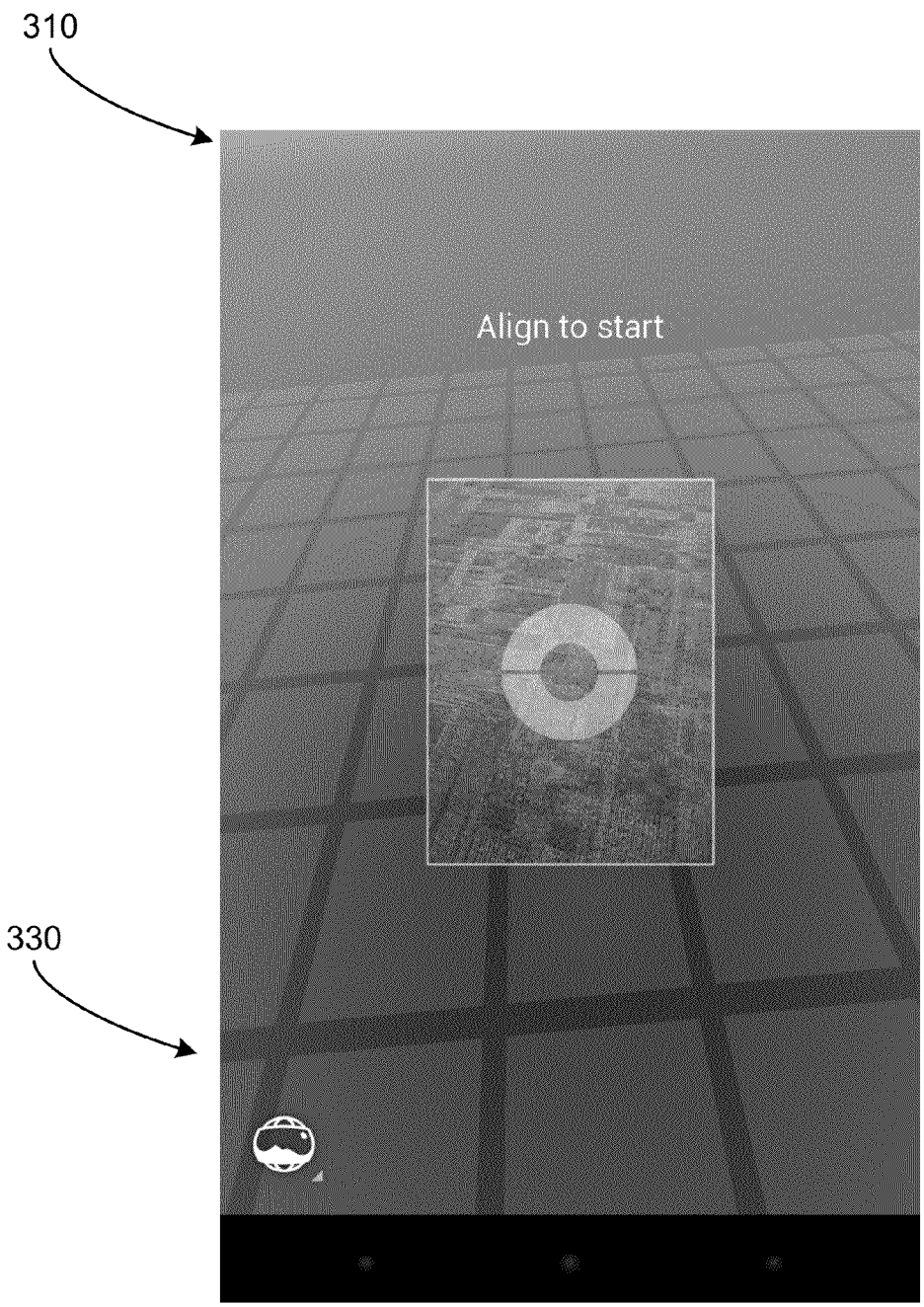
FIGS. 3-8 depict illustrations of a sequence of image captures, according to an example implementation.
Figure 4:
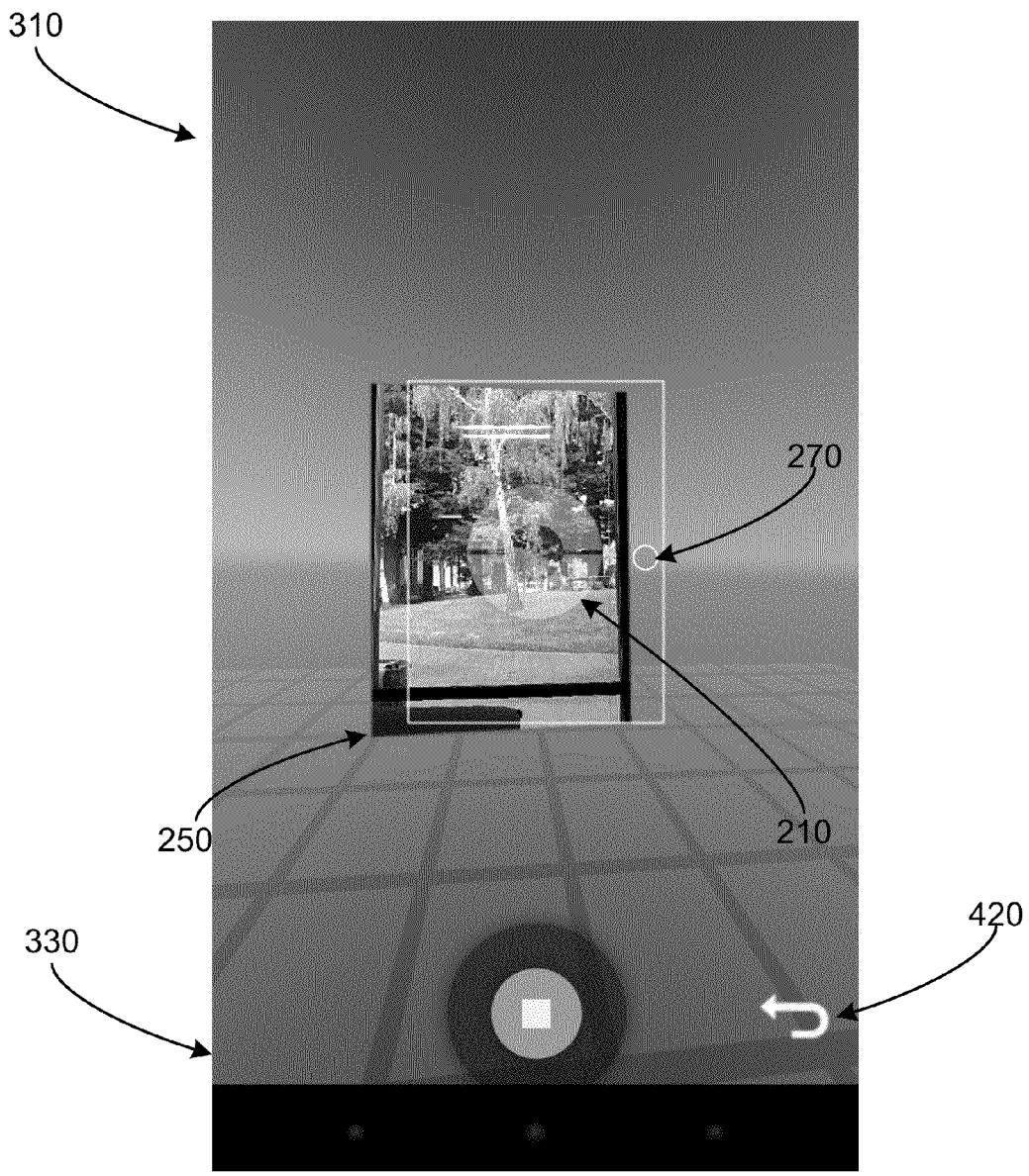
Figure 5:
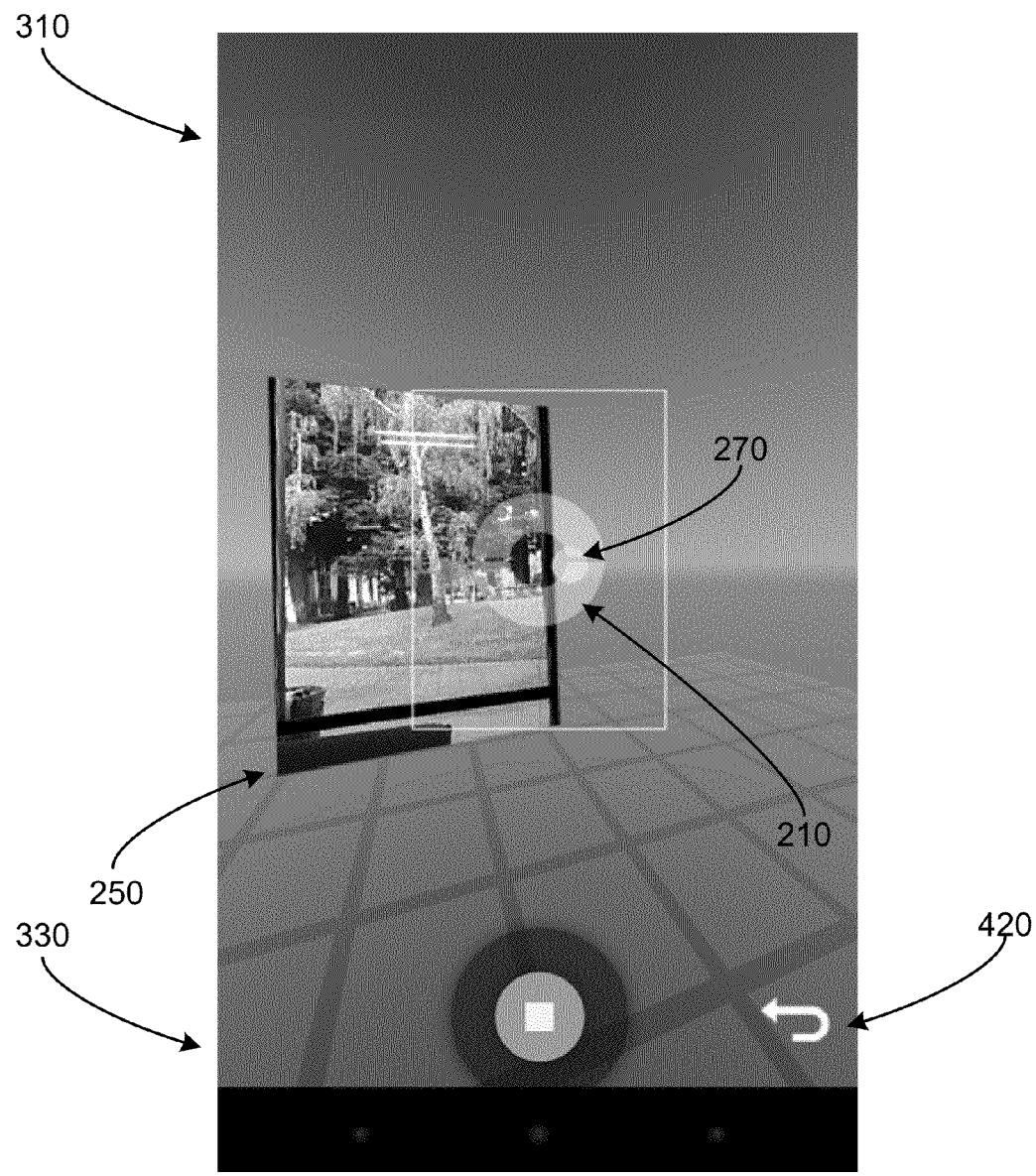

FIG. 2 depicts an example graphical user interface 200 for capturing a sequence of images on a smartphone 100 with a built-in camera 170. In some implementations, a representation of previously captured images 250 may be displayed by the user interface. For example, in FIG. 2, a first image has been captured, and its representation 250 is displayed on screen. In some implementations, the representation of previously captured images can be thumbnails, or previews, of the previously captured images. Moreover, in some implementations, the thumbnails can be arranged into a virtual projection, for example, so as to appear on the inside surface of a sphere. In another example implementation, previously captured images can be represented by frames, and/or identifiers, for example image capture sequence numbers. Also displayed on the display 150 is an indication representing a current focal point 210 or current field of view of the image capture device 170.

Figure 6:
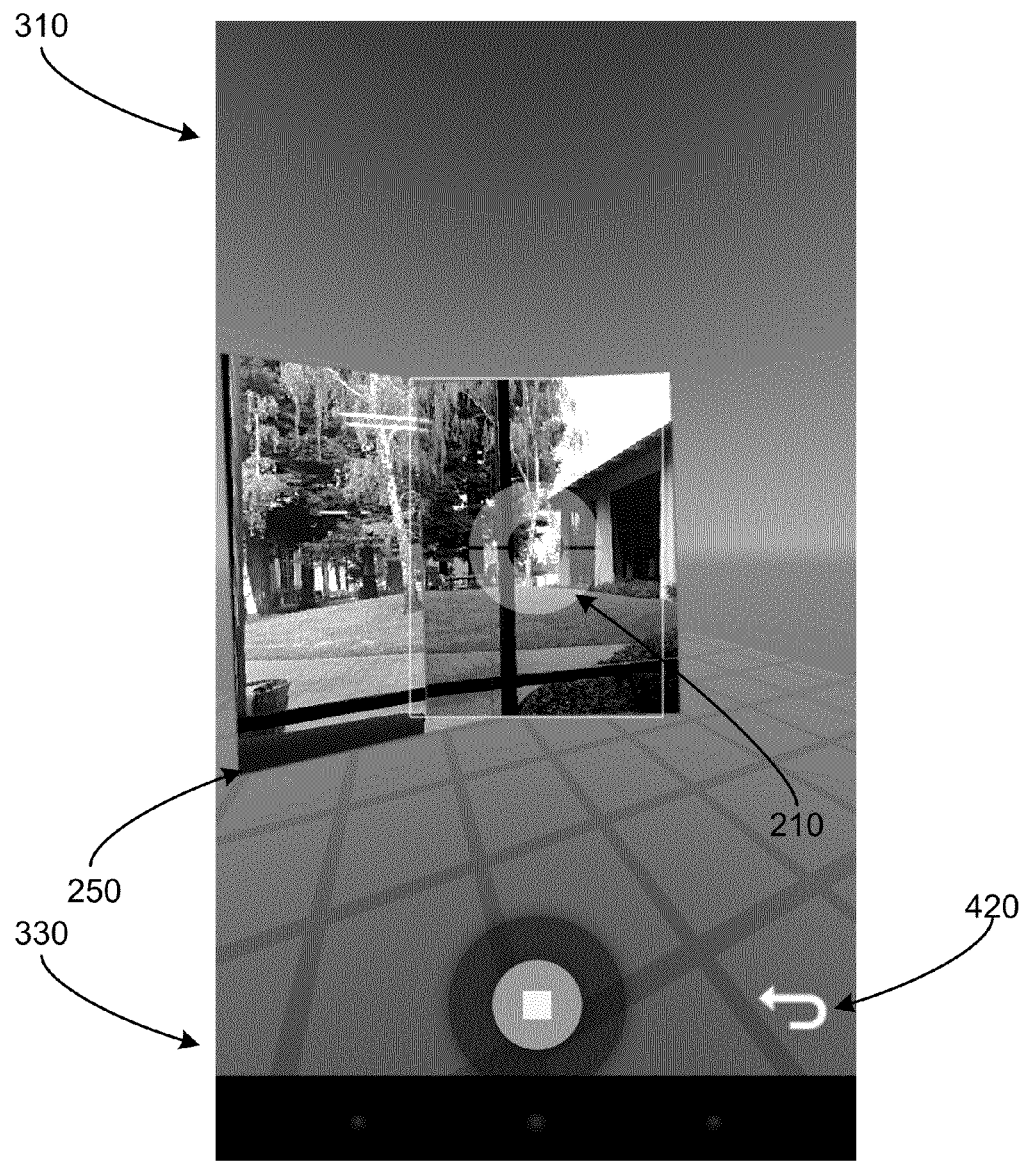

Shown in FIG. 2, around the border of the representation of the previously captured images 270, is a plurality of smart targets 270. As shown, a smart target may be a graphical target indicated on a display 150 by a ring with a dashed border. A smart target may represent a target focal point to direct the image capture device 170 to, in order to capture a next suitable image for composition into a panoramic or wide-angle image. The target focal point may correspond to the center of a region representing a potential next image to be captured. In some implementations, the corresponding region may be contiguous with or overlapping the representation of one or more previously captured images. For example, as shown in FIG. 2, each of the smart targets lying on the border of the representation of the first captured image can represent another region 271 with the particular smart target as the center. Thus, in an example implementation, when the smart target is substantially aligned with, or within a threshold distance of, the representation of the current focal point 210 or center of the field of view of the camera 170, the representation of an image captured at that current focal point may correspond to the region 271 associated with the smart target. In some implementations, the corresponding region 271 for each smart target may be visible, but does not have to be. After a second image is captured, the second image may be added to the representation of previously captured images 250, as shown in FIG. 6.

A smart target 270 need not necessarily lie on the border of the representation of previously captured images 250. For example, in FIGS. 3-8, the smart targets appear outside the representation of previously captured images. Moreover, a smart target need not be indicated on a display by a circle with a dashed border, as shown in FIG. 2. In FIGS. 3-8, the smart targets are each indicated by a shaded circle. In addition to visual indications, in some implementations, a smart target may be indicated by an audible sound, tactile feedback, or other notification. Other suitable indicia for indicating smart targets, visual or otherwise, will be obvious to one of skill in the art.

In certain example implementations, a limited number of discrete smart targets 270 may be provided to indicate a next camera focal point or center of field of view for capturing a suitable image. For example, FIG. 2 shows six smart targets representing target focal points. In FIGS. 3-8, only a single smart target is displayed. Displaying a limited number of discrete smart targets gives a user a limited number of target focal points to choose from, resulting in less indecision between image captures, as suggested by Hick's law. In some implementations, although a first number of suggested target focal points might be determined, only a subset of the smart targets corresponding to those focal points may be displayed on screen. For example, four target focal points might be calculated for a next image, but only two of those might be represented visually as smart targets. In some implementations, there may be a predefined limit to the number of smart targets displayed at one time.

Figure 8:
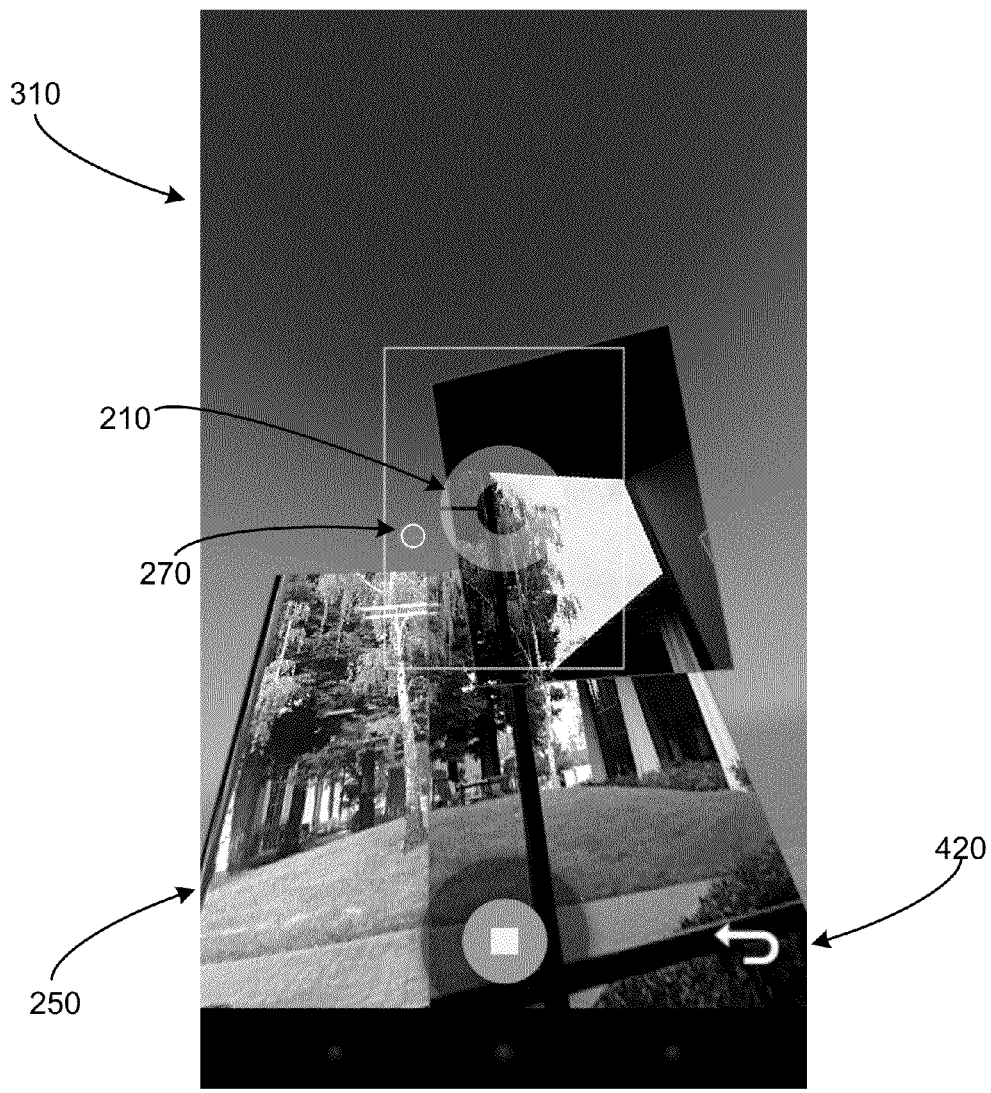

In some implementations, the number and/or location of smart targets 270 displayed may be based on the number and/or pattern of previously captured images, or may be based on the representation of the previously captured images 250. In one implementation, a pattern of smart targets may be displayed that, if acted upon, would result in a particular shape or pattern of previously captured images. For example, smart targets may be suggested, that if acted upon, would result in the representation of the previously captured images forming a substantially rectangular area, or "grid." For example, FIG. 8 shows a suggested smart target 270 that, if acted upon, could result in the completion a 2×2 grid of captured images.

Figure 7:
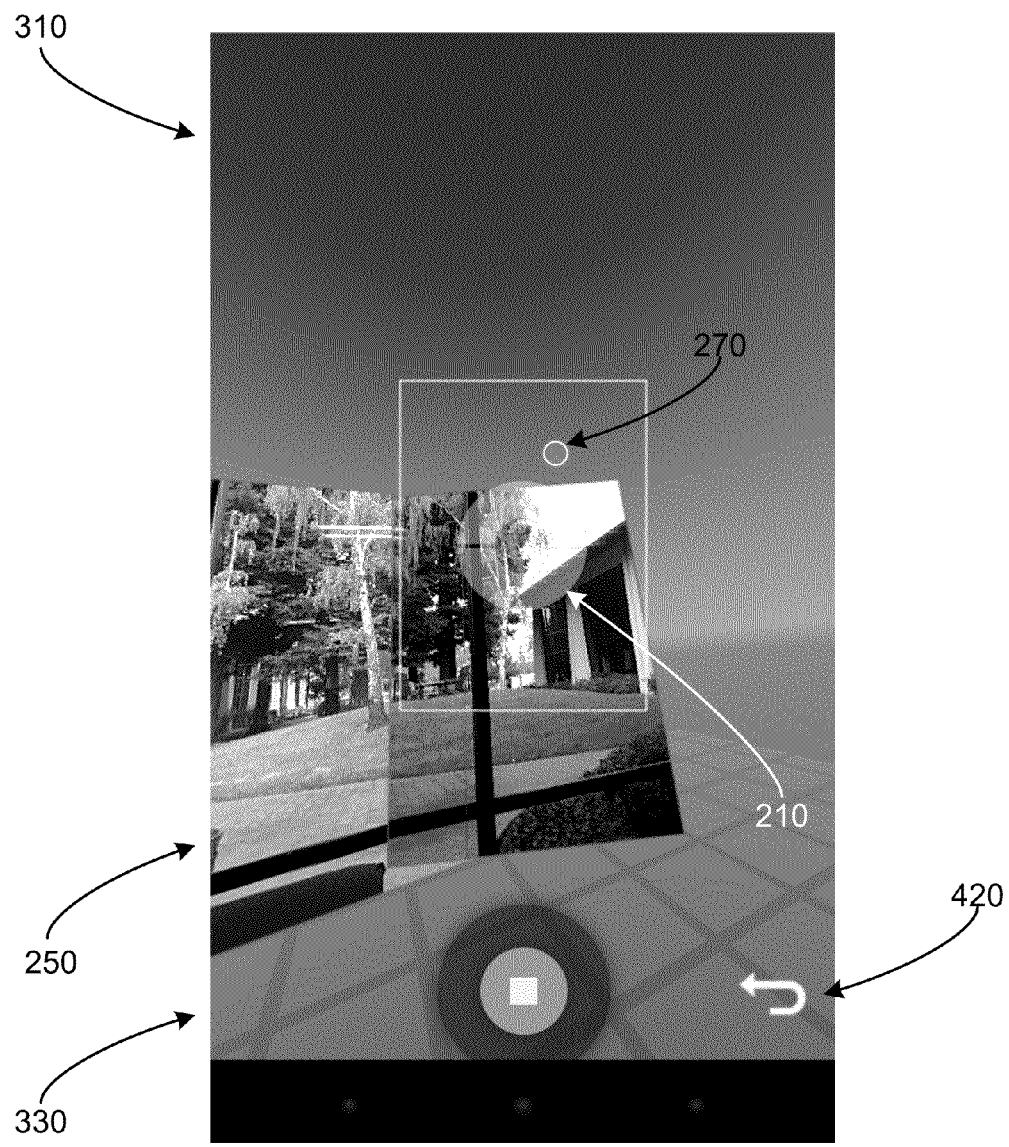

In some implementations, the number and/or location of smart targets 270 displayed may be based on the motion and/or orientation of the image capture device 170. For example, if the current focal point 210 or current field of view of the image capture device is disposed in a particular direction from the representation of previously captured images 210, smart targets on the side of the representation 210 corresponding to that direction may be prioritized or exclusively selected for display over other smart targets. In an example implementation, smart targets may not be displayed until a next direction for the current field of view of the image capture device is detected. For example, as shown in FIG. 6, although the second image has been captured, the current field of view of the image capture device 170 has not changed substantially from when the second image was captured. Consequently, a smart target has yet to be displayed. However, once an initial movement direction is detected, a smart target may be suggested according to that direction, as shown in FIG. 7.

As panoramic images are typically cropped to a rectangular area, displaying smart targets 270 in positions that would result in rectangular captured image area or grid reduces the number of excess or wasted captured images outside the area or grid that would otherwise be lost or discarded during a panoramic image composition process. Reducing the number of images may conserve resources such as battery power, memory usage, and time. Moreover, assembling fewer images may be computationally less intensive.

In some implementations, smart targets 270 may be selected and displayed based on a predefined aspect ratio. For example, in one implementation, smart targets could be suggested consistent with forming a 5×2 grid of captured images. In some implementations, a desired or intended aspect ratio may be selected before, or during capture of a sequence of images. In another example implementation, smart targets may be selected and displayed based on the geometry of the camera optics to help ensure a desired overlap between captured images.

In certain example implementations, to further reduce the number of inefficient images captured, user access to the functionality of the image capture device 170 may be restricted. For example, in some implementations, user access to a camera may be disabled (or the camera itself disabled) immediately after or in response to an image being captured. Access may be re-enabled or the camera reactivated when the current focal point 210 or center of the representation of the current field of view of the camera is within a threshold distance of a target focal point or smart target, respectively. Thus, images may only be captured when the displayed indication representing the current focal point 210 of the image capture device 170 is at, or sufficiently near, a smart target 270. In some representations, the smart target and indication of the current focal point may appear to align as a threshold distance is neared or crossed.

In certain example implementations, an image may be automatically captured when the center of the current field of view of the image capture device 170 is within a threshold distance of a smart target 270. Thus, in these implementations, a user is not required to manually activate the image capture device 170 in order to take a sequence of photographs. Accordingly, a user may quickly capture a sequence of suitable images by moving a camera so that the focal point of the camera moves between the target focal points of smart targets.

In other implementations, user interaction may still be required to activate or trigger the image capture device 170, for example, the selection of a hardware or software button. In such implementations permitting manual image capture, the image capture device 170 may be manipulated so as to direct the current focal point 210 or center of the current field of view within a threshold distance of a smart target 270, then, without capturing an image, current field of few may be directed towards a different smart target. In this way, a user can "preview" a camera view at a target focal point without committing to capturing an image.

In some implementations, an "undo" functionality 420 may be provided that discards the last image capture, whether manually or automatically initiated. Triggering the undo functionality can remove the last captured image from the representation of previously captured images 250, and in an example implementation, reset the displayed smart targets. In another example implementation, a particular previously captured image or group of previously captured images can be selectively "undone" or removed, even if those images were not the most recent one or more images captured.

In certain example implementations, an indication or notification can be provided when the representation of the current focal point 210 or center of the current field of view of the image capture device 170 is within a predefined distance of a smart target 270. For example, in some implementations, the smartphone may emit a tone through a sound production device 180, or change the color of a smart target 270 when the current focal point 210 is within a threshold distance of a target focal point, as illustrated by the change in the smart target 270 to the right of the representation of previously captured images 250 in FIGS. 4-5.

In some implementations, an indication or notification of proximity to a smart target may be provided, even if the current focal point is not close enough to be within a threshold distance suitable for initiating the capture of an image. For example, a smart target area could pulse, or the smartphone could vibrate based on the proximity of the center of the current field of view of the camera to a target focal point. Other suitable indicia, visual or otherwise, for indicating proximity to smart targets, will be obvious to one of skill in the art.

In certain example implementations, suitable images can be captured along multiple axes. In other words, a sequence of captured images need not necessarily all be aligned in a horizontal or vertical line. In some implementations, smart targets 270 may be displayed associated with target focal points displaced in two or more degrees of freedom from the focal point associated with a previously captured image. Thus, some implementations support displaying smart targets and capturing images along multiple axes, as shown in FIGS. 7-8.

In certain example implementations, the representation of previously captured images 250 can be formatted according to various spherical projections, including but not limited to, rectilinear, Mercator, sinusoidal, cylindrical, fisheye, and stereographic projections. In some implementations, the projection used may be based on the previously captured images, and the projection may change during the capture of a sequence of images, for example to a more suitable projection for formatting the representation of previously captured images 250. For example, a rectilinear projection may be used until the number of degrees represented by previously captured images exceeds a predefined range, such as 120 degrees, and then a fisheye projection until 180 degrees. Additional projections and their use are understood to be within the scope of this disclosure.

In certain example implementations, an indication may be displayed of the current field of view or orientation of the image capture device 170 and/or computing device 100 relative to a reference frame. For example, in some implementations, an indication of a baseline plane or point of reference may be visually indicated. In FIGS. 3-8, a virtual "sky" 310 is indicated by the gradient at the top of the figures with a virtual floor 330, and a horizon in-between.

In certain example implementations, a preview window 290 may be displayed. In some implementations, the preview window may show the previously captured images arranged in a grid. In an example implementation, the grid can be formatted to dimensions corresponding to a desired or target aspect ratio. In another example implementation, the preview window can indicate the positions at which images are missing to complete the grid of captured images. In another example implementation, the preview window may show a zoomed-out, or wide-angle view of the representation of the previously captured images 250.

Figure 9:
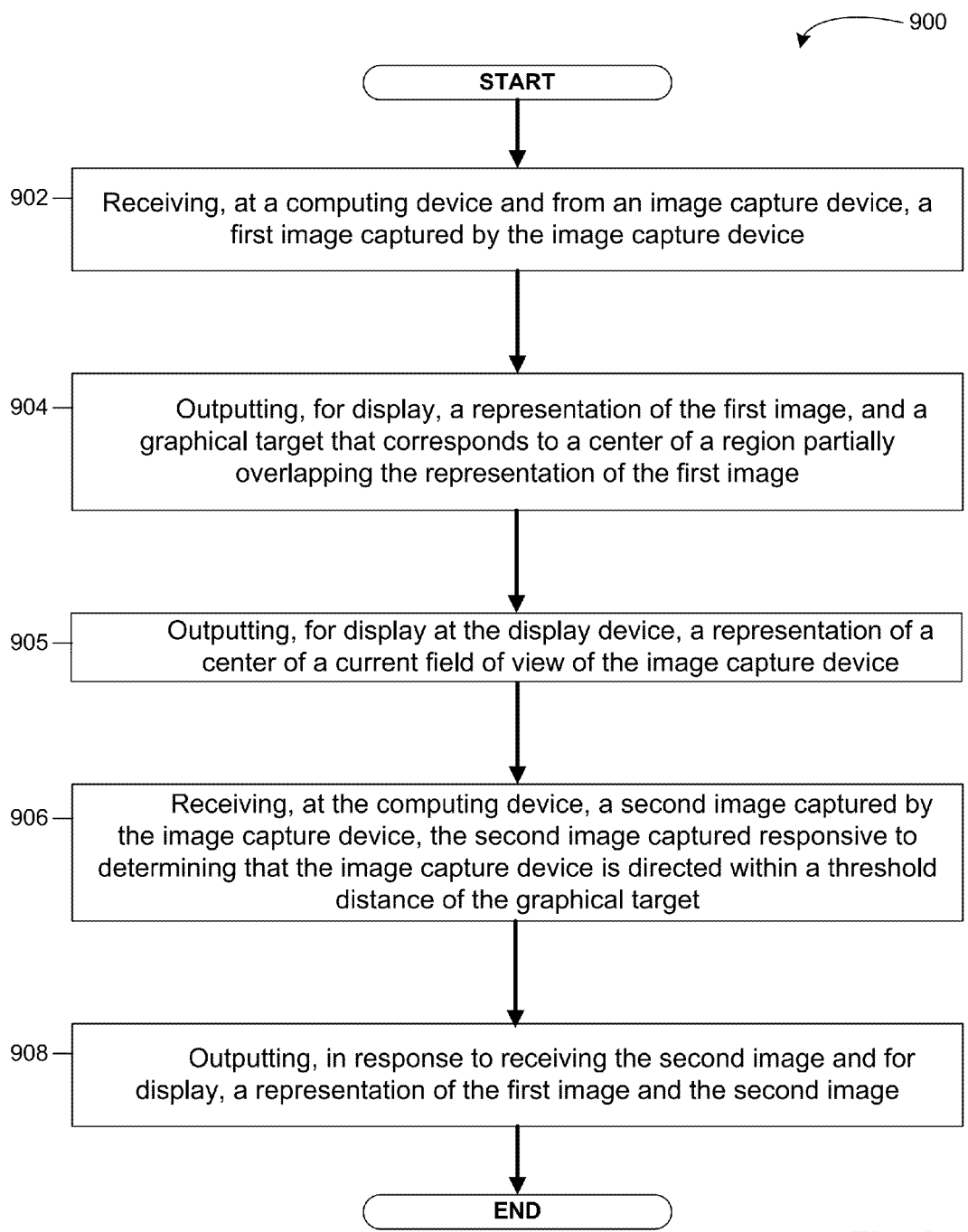
FIG. 9 depicts an illustrative flow diagram of a method, according to an example implementation.

An example method 900 for facilitating the capture of contiguous images will now be described with reference to the flow diagram of FIG. 9. The method 900 starts in block 902, and according to an example implementation includes receiving, at a computing device and from an image capture device, a first image captured by the image capture device. In block 904, the method 900 includes outputting, for display at a display device, a representation of the first image, and a graphical target that corresponds to a center of a region representing a potential second image to be captured, the region partially overlapping the representation of the first image. In block 905, the method 900 includes outputting, for display at the display device, a representation of a center of a current field of view of the image capture device. In block 906, the method 900 includes receiving, at the computing device, a second image captured by the image capture device, the second image captured responsive to determining that the representation of the center of the current field of view of the image capture device is within a threshold distance, on the display device, of the graphical target. In block 908, the method 900 includes outputting, in response to receiving the second image and for display, a representation of the first image and the second image.

Various implementations of the disclosed technology may be embodied in non-transitory computer readable media for execution by a processor. An example implementation may be used in an application of a mobile computing device, such as a smartphone or tablet, but other computing devices, including non-portable computing devices, may also be used.

Figure 10:
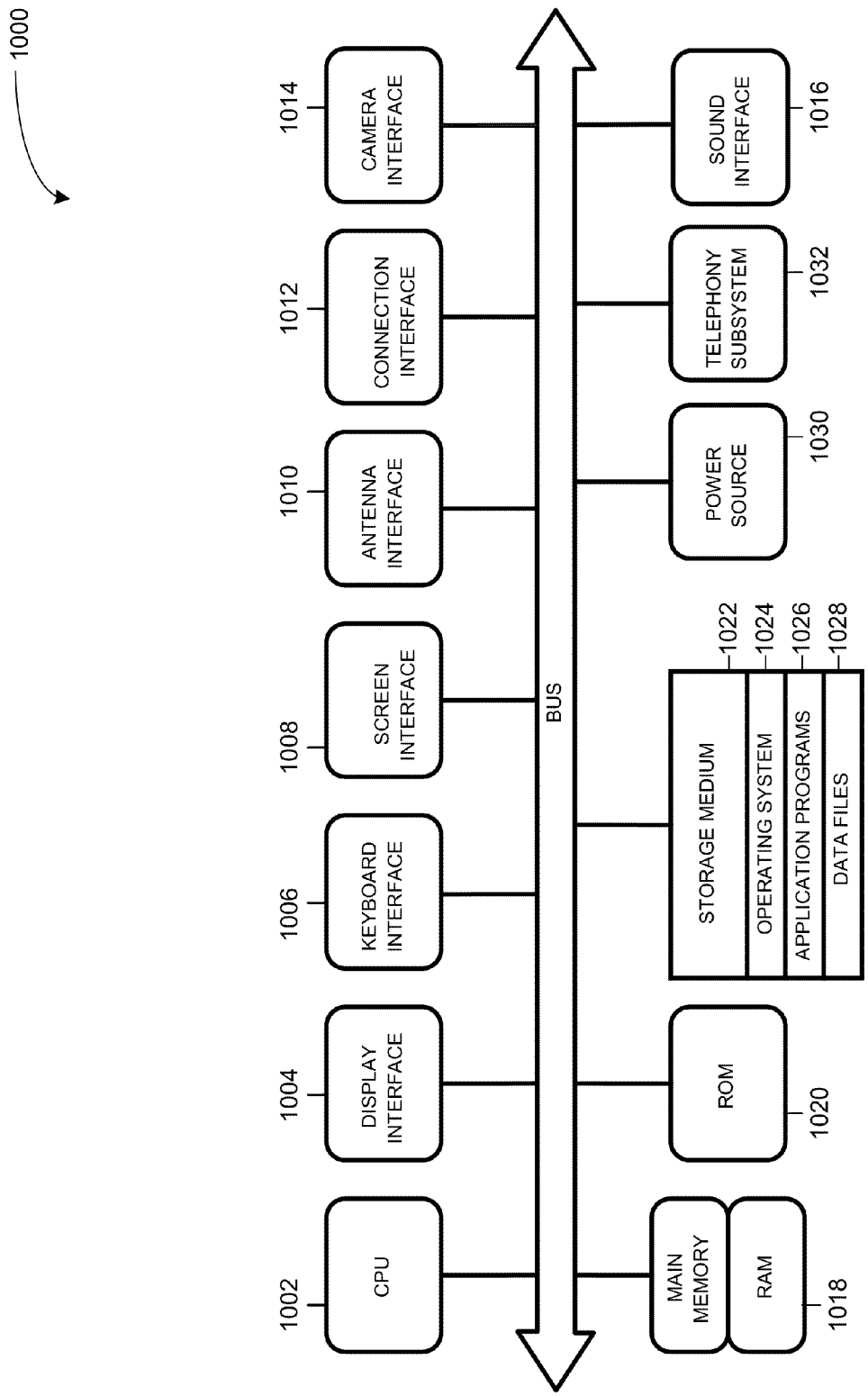
FIG. 10 depicts an illustrative block diagram of a computing device system architecture, according to an example implementation.

FIG. 10 depicts a block diagram of an illustrative computer system architecture 1000 according to an example implementation. Certain aspects of FIG. 10 may be embodied in a computing device (for example, the computing device 100 as shown in FIG. 1). Various implementations and methods herein may be embodied in non-transitory computer readable media for execution by a processor. It will be understood that the architecture 1000 is provided for example purposes only and does not limit the scope of the various implementations of the communication systems and methods.

The architecture 1000 of FIG. 10 includes a central processing unit (CPU) 1002, where computer instructions are processed; a display interface 1004 that acts as a communication interface and provides functions for rendering video, graphics, images, and texts on coupled displays; a keyboard interface 1006 that provides a communication interface to a keyboard; and a pointing device interface 1008 that provides a communication interface to a pointing device, e.g., a touchscreen or presence-sensitive screen. Example implementations of the architecture 1000 may include an antenna interface 1010 that provides a communication interface to an antenna. Example implementations may include a connection interface 1012. The connection interface may include one or more of a peripheral connection interface and network communication interface, providing a communication interface to an external device or network. In certain implementations, a camera interface 1014 may be provided that acts as a communication interface and provides functions for capturing digital images from a camera. In certain implementations, a sound interface 1016 may be provided as a communication interface for converting sound into electrical signals using a microphone and for converting electrical signals into sound using a speaker. According to example implementations, a random access memory (RAM) 1018 may be provided, where computer instructions and data may be stored in a volatile memory device for processing by the CPU 1002.

According to an example implementation, the architecture 1000 may include a read-only memory (ROM) 1020 where invariant low-level system code or data for basic system functions such as basic input and output (I/O), startup, or reception of keystrokes from a keyboard are stored in a non-volatile memory device. According to an example implementation, the architecture 1000 may include a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the architecture 1000 may include a power source 1030 that provides an appropriate alternating current (AC) or direct current (DC) to power components. According to an example implementation, the architecture 1000 may include a telephony subsystem 1032 that allows the device 1000 to transmit and receive sound over a telephone network. The constituent devices and the CPU 1002 may communicate with each other over a bus 1034.

In accordance with an example implementation, the CPU 1002 may have appropriate structure to be a computer processor. In one arrangement, the computer CPU 1002 may include more than one processing unit. The RAM 1018 may interface with the computer bus 1034 to provide quick RAM storage to the CPU 1002 during the execution of computing programs such as the operating system application programs, and device drivers. More specifically, the CPU 1002 may load computer-executable process steps from the storage medium 1022 or other media into a field of the RAM 1018 in order to execute computing programs. Data may be stored in the RAM 1018, where the data may be accessed by the computer CPU 1002 during execution. In one example configuration, the device 1000 may include at least 128 MB of RAM, and 256 MB of flash memory.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow the device 1000 to access computer-executable process steps, application programs and the like, stored on removable and non-removable memory media, to off-load data from the device 1000 or to upload data onto the device 1000. A computer program product, such as one utilizing a communication system may be tangibly embodied in storage medium 1022, which may comprise a machine-readable storage medium.

In an example implementation of the disclosed technology, the computing device computing system architecture 1000 may include any number of hardware and/or software applications that are executed to facilitate any of the operations. In an example implementation, one or more I/O interfaces may facilitate communication between the mobile device computing system architecture 1000 and one or more input/output devices. For example, a universal serial bus port, a serial port, a disk drive, a CD-ROM drive, and/or one or more user interface devices, such as a display, keyboard, keypad, mouse, control panel, touchscreen display, microphone, etc., may facilitate user interaction with the mobile device computing system architecture 1000. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the mobile device computing system architecture 1000 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, a proximity network, etc., for communication with external devices and/or systems. As desired, implementations of the disclosed technology may include the mobile device computing system architecture 1000 with more or less of the components illustrated in FIG. 10.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
receiving, at a computing device and from an image capture device, a first image captured by the image capture device;
outputting, for display at a display device, a representation of the first image and a graphical target that corresponds to a center of a region representing a potential second image to be captured, the region partially overlapping the representation of the first image;
outputting, for display at the display device, a representation of a center of a current field of view of the image capture device;
receiving, at the computing device, a second image captured by the image capture device, the second image captured responsive to determining that the representation of the center of the current field of view of the image capture device is within a threshold distance, on the display device, of the graphical target; and
outputting, for display at the display device, in response to receiving the second image and for display, a representation of the first image and the second image.

2. The method of claim 1, further comprising:
directing the image capture device to automatically capture the second image in response to determining that the representation of the center of the current field of view of the image capture device is within the threshold distance, on the display device, of the graphical target.

3. The method of claim 1, further comprising:
outputting, for display at the display device, an indication that the representation of the center of the current field of view of the image capture device is within the threshold distance, on the display device, of the graphical target.

4. The method of claim 1, further comprising:
disabling user access to an image capture functionality of the image capture device after receiving the first image from the image capture device; and
enabling user access to the image capture functionality in response to determining that the representation of the center of the current field of view of the image capture device is within the threshold distance, on the display device, of the graphical target.

5. The method of claim 1, further comprising:
detecting, after receiving the first image from the image capture device, a change in the current field of view of the image capture device; and
selecting the graphical target in response to, and based on, the detected change in the current field of view of the image capture device.

6. The method of claim 1, further comprising:
receiving an indication of a target aspect ratio; and
selecting the graphical target based on the indication of the target aspect ratio.

7. The method of claim 1, wherein:
the graphical target is a first graphical target; and
the first image was captured by the image capture device responsive to a determination that the center of the current field of view of the image capture device was at a second graphical target, and wherein the second graphical target is disposed, on the display device, in a direction at least two degrees of freedom from the first graphical target.

8. The method of claim 1, further comprising:
outputting, for display, an indication of a fixed reference frame relative to the current field of view of the image capture device.

9. A system comprising:
a display device;
at least one processor operatively coupled to the display device;
an image capture device coupled to the at least one processor; and
at least one memory operatively coupled to the at least one processor and configured for storing data and instructions that, when executed by the at least one processor, cause the at least one processor to:
receive, at the at least one processor and from an image capture device, a first image captured by the image capture device;
output, for display at the display device, a representation of the first image and a graphical target that corresponds to a center of a region representing a potential second image to be captured, the region partially overlapping the representation of the first image;
output, for display at the display device, a representation of a center of a current field of view of the image capture device;
receive, at the at least one processor, a second image captured by the image capture device, the second image captured responsive to determining that the representation of the center of the current field of view of the image capture device is within a threshold distance, on the display device, of the graphical target; and
output, for display at the display device, in response to receiving the second image and for display, a representation of the first image and the second image.

10. The system of claim 9, wherein the instructions, when executed by the at least one processor, further cause the at least one processor to:
prompt the image capture device to automatically capture the second image in response to determining that the representation of the center of the current field of view of the image capture device is within the threshold distance of the graphical target.

11. The system of claim 9, wherein the instructions, when executed by the at least one processor, further cause the at least one processor to:
output, for presentation, an indication that the representation of the center of the current field of view of the image capture device is within the threshold distance of the graphical target.

12. The system of claim 9, wherein the instructions, when executed by the at least one processor, further cause the at least one processor to:
disable user access to an image capture functionality of the image capture device after receiving the first image by the image capture device;
enable user access to the image capture functionality in response to determining that the representation of the center of the current field of view of the image capture device is within the threshold distance of the graphical target.

13. The system of claim 9, wherein the instructions, when executed by the at least one processor, further cause the at least one processor to:
detect, after receiving the first image by the image capture device; a change in the current field of view of the image capture device; and
select the graphical target in response to, and based on, the detected change in the current field of view of the image capture device.

14. The system of claim 9, wherein the instructions, when executed by the at least one processor, further cause the at least one processor to:
receive an indication of a target aspect ratio; and
select the graphical target based on the indication of the target aspect ratio.

15. A computer-readable medium that stores instructions that, when executed by at least one processor in a system, cause the at least one processor to perform a method comprising:
receiving, at the at least one processor and from an image capture device, a first image captured by the image capture device;
outputting, for display at a display device, a representation of the first image and a graphical target that corresponds to a center of a region representing a potential second image to be captured, the region partially overlapping the representation of the first image;
outputting, for display at the display device, a representation of a center of a current field of view of the image capture device;
receiving, at least one processor, a second image captured by the image capture device, the second image captured responsive to determining that the image capture device is within a threshold distance, on the display device, of the graphical target; and
outputting, for display at the display device, in response to receiving the second image and for display, a representation of the first image and the second image.

16. The method of claim 15 further comprising directing the image capture device to automatically capture the second image in response to determining that the representation of the center of the current field of view of the image capture device is within the threshold distance, on the display device, of the graphical target.

17. The method of claim 15 further comprising:
disabling user access to an image capture functionality of the image capture device after receiving the first image by the image capture device;
enabling user access to the image capture functionality in response to determining that the representation of the center of the current field of view of the image capture device is within the threshold distance of the graphical target.

18. The method of claim 15 further comprising:
detecting, after receiving the first image by the image capture device; a change in the current field of view of the image capture device; and
selecting the graphical target in response to, and based on, the detected change in current field of view of the image capture device.

19. The method of claim 15 further comprising:
receiving an indication of a target aspect ratio; and
selecting the graphical target based on the indication of the target aspect ratio.

20. The method of claim 15, wherein:
the graphical target is a first graphical target; and
the first image was captured by the image capture device responsive to a determination that center of the center of the current field of view of the image capture device was at a second graphical target, and wherein the second graphical target is disposed in a direction at least two degrees of freedom, on the display device, from the first graphical target.

\* \* \* \* \*